United States Patent
Ylamurto

(10) Patent No.: US 7,065,154 B2
(45) Date of Patent: Jun. 20, 2006

(54) BASEBAND PREDISTORTION METHOD FOR MULTICARRIER TRANSMITTERS

(75) Inventor: Tommi Ylamurto, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 814 days.

(21) Appl. No.: 09/753,300

(22) Filed: Dec. 29, 2000

(65) Prior Publication Data
US 2002/0118767 A1 Aug. 29, 2002

(51) Int. Cl.
H04K 1/02 (2006.01)
H04L 25/03 (2006.01)
H04L 25/49 (2006.01)

(52) U.S. Cl. .................... 375/296; 375/285
(58) Field of Classification Search ........ 375/285, 375/260, 261, 295, 296, 297, 298; 455/126
See application file for complete search history.

(56) References Cited

U.S. PATENT DOCUMENTS

| | | | | |
|---|---|---|---|---|
| 5,111,155 A | * | 5/1992 | Keate et al. | 330/149 |
| 5,162,763 A | * | 11/1992 | Morris | 332/170 |
| 5,351,016 A | * | 9/1994 | Dent | 332/103 |
| 5,371,481 A | * | 12/1994 | Tiittanen et al. | 332/103 |
| 5,396,656 A | * | 3/1995 | Jasper et al. | 455/295 |
| 5,423,082 A | * | 6/1995 | Cygan et al. | 455/126 |
| 5,469,105 A | * | 11/1995 | Sparks | 330/129 |
| 5,524,286 A | | 6/1996 | Chiesa et al. | |
| 5,542,096 A | * | 7/1996 | Cygan et al. | 455/115.2 |
| 5,574,994 A | * | 11/1996 | Huang et al. | 455/126 |
| 6,054,894 A | * | 4/2000 | Wright et al. | 330/149 |
| 6,081,158 A | * | 6/2000 | Twitchell et al. | 330/149 |
| 6,288,610 B1 | * | 9/2001 | Miyashita | 330/149 |
| 6,298,096 B1 | * | 10/2001 | Burgin | 375/296 |
| 6,587,513 B1 | * | 7/2003 | Ichihara | 375/296 |
| 6,618,096 B1 | * | 9/2003 | Stapleton | 348/608 |
| 6,738,431 B1 | * | 5/2004 | Laurent | 375/296 |
| 2002/0064236 A1 | * | 5/2002 | Matsuoka et al. | 375/296 |
| 2003/0067995 A1 | * | 4/2003 | Matsuoka et al. | 375/296 |

* cited by examiner

Primary Examiner—Jean B. Corrielus
(74) Attorney, Agent, or Firm—Squire, Sanders & Dempsey LLP

(57) ABSTRACT

A multicarrier transmitter is shown having an embodiment of the invention. Sampling of modulated and amplified signals is done to obtain energy values for four or more symbols. Combining the energy values with the baseband in-phase and quadrature signals of the multiple carriers may result in a set of imbalance parameters, which are subsequently stored. Later baseband in phase and quadrature signals are predistorted or compensated by applying the stored imbalance parameters to produce new compensated baseband in-phase and compensated baseband quadrature signals, which are suitable for input to an inverse fast fourrier transform (IFFT) block.

6 Claims, 1 Drawing Sheet

BASEBAND PREDISTORTION METHOD FOR MULTICARRIER TRANSMITTERS

FIELD OF THE INVENTION

This invention relates to transmitting and amplifying signals that at the baseband are digital and more specifically to applying a predistortion algorithm to compensate for inaccuracies introduced by amplifiers, filters and modulator in a multicarrier transmitter. The biggest sources of imbalance tends to be baseband filters and the modulator. The biggest source of gain inaccuracy tends to be the power amplifier.

BACKGROUND OF THE INVENTION

Wireless LAN standards require extremely good modulation accuracy and accuracy of transmitted power. Amplitude and phase imbalances between the in-phase and quadrature branches of the transmitter produce errors in the modulated signal. Good balance is difficult to obtain due to component variations and due to the fact that the amplitude and phase of the phase splitting circuits is frequency dependent. In addition imbalances occur because of fluctuating temperatures.

SUMMARY OF THE INVENTION

According to an embodiment of the invention, four data symbols are used as raw data, together with at least four transmitted symbols to arrive at several imbalance parameters, which may be used to modify subsequent data symbols. The four transmitted symbols may be sampled, and serve as the basis for calculating the energy of the four transmitted symbols. A calculation of alpha, epsilon and gain imbalance parameters may be made based on the four data symbols and the energy of the four transmitted symbols. Alpha, epsilon and gain are stored. First quadrature compensating of a next data symbol is done based on the alpha, epsilon, and gain to produce a first quadrature compensated data symbol (FQCDS). Second quadrature compensating the next data symbol is done based on the alpha, epsilon and gain to produce a second quadrature compensated data symbol (SQCDS). First in-phase compensating of the next data symbol is done to produce a first in-phase compensated data symbol (FICDS). Second in-phase compensating of the next data symbol is done to produce a second in-phase compensated data symbol (SICDS).

According to another embodiment of the invention, alpha, epsilon and gain are available preset into appropriate storage. Each data symbol may be compensated based on this preset information. First quadrature compensating of a data symbol is done based on the alpha, epsilon, and gain to produce a first quadrature compensated data symbol. Second quadrature compensating the data symbol is done based on the alpha, epsilon and gain to produce a second quadrature compensated data symbol. First in-phase compensating of the data symbol is done to produce a first in-phase compensated data symbol. Second in-phase compensating of the data symbol is done to produce a second in-phase compensated data symbol.

Among the benefits of the embodiments of the invention, the effects, at least of one time, of the phase and amplitude imbalance may be stored. In addition gain inaccuracies and local oscillator (LO) leakage may be measured and stored in a new form as a set of imbalance parameters.

The first embodiment may routinely sample a transmitter output to obtain timely imbalance parameters (referred to sometimes as $\alpha$, $\epsilon$ and g) which may be influenced in part, by data sampled at a baseband level, prior to operation of a inverse fast fourrier transform (IFFT). The routine updating of imbalance parameters may reflect a changing environment, including variation of amplification on several frequencies and the effects of changing temperatures.

The embodiments, once having obtained imbalance parameters, may apply those imbalance parameters to predistort or compensate one or more baseband symbols so that the amplified signal output of the amplifier has a narrower range of errors in relation to phase, amplitude and gain.

BRIEF DESCRIPTION OF THE DRAWINGS

The disclosed inventions will be described with reference to the accompanying drawings, which show important sample embodiments of the invention, wherein.

DETAILED DESCRIPTION OF THE PREFERRED EMBODIMENTS

Figure 1:
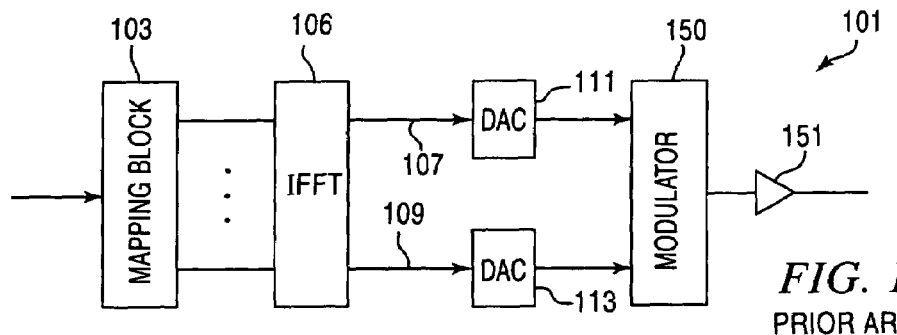
FIG. 1 shows a prior art Orthogonal Frequency Division Multiplexing (OFDM) transmitter.

FIG. 1 shows an Orthogonal Frequency Division Multiplexing (OFDM) transmitter 101, which is known in the art. Binary data enters the mapping block 103, which converts the data into N pairs of I and Q signals, wherein N represents the number of subcarrier frequencies that are modulated by the signals These N pairs are fed into Inverse Fast Fourier Transform (IFFT) 106. IFFT 106 produces the $S_I(t)$ (or in-phase) signal 107 and the $S_Q(t)$ (or quadrature) signal 109 according to the following formula:

$$S_I(t) = \sum_{n=1}^{N/2} a_{N/2-n} \cos(n\omega_c t - \varphi_{N/2-n}) + a_{N/2+n+1} \cos(n\omega_c t + \varphi_{N/2+n+1}) \quad [1]$$

$$S_Q(t) = \sum_{n=1}^{N/2} -a_{N/2-n} \sin(n\omega_c t - \varphi_{N/2-n}) + a_{N/2+n+1} \sin(n\omega_c t + \varphi_{N/2+n+1}) \quad [2]$$

where a, $\Phi$, $\omega$ and N are the amplitude, phase and the frequency of the carriers, and N is the number of subcarriers, respectively. Digital to analog converter (DAC) 111 converts $S_I(t)$ 107 to analog. Similarly DAC 113 converts $S_q(t)$ 109 to analog. The analog signals enter the modulator 150 and are subsequently amplified by amplifier 151. The modulator may be a direct conversion-type of modulator.

Figure 2:
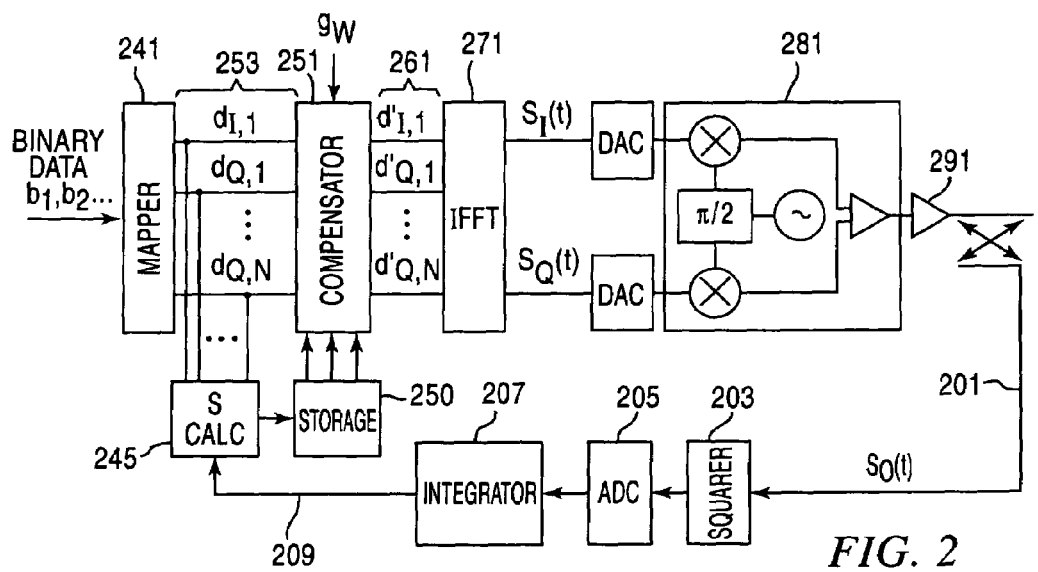
FIG. 2 shows a transmitter according to an embodiment of the invention.

FIG. 2 shows a transmitter according to an embodiment of the invention. Directional coupler 201 may obtain the waveform as amplified by amplifier, that is a transmitted symbol. Subsequently transmitted symbols are next symbols. The signal is provided to a squarer 203, which may be an analog device. An analog to digital converter follows 205. The signal may be integrated over the duration of a transmitted symbol using integrator 207, to provide an energy value 209 or energy of the transmitted symbol according to the following equation:

$$P_k = \int_0^{T_s} s_{o,k}^2(t)dt, \qquad [3]$$

The term k represents the symbol number and $T_s$ is the duration of one symbol. The energy 209 of four transmitted symbols thus is $P_1$, $P_2$, $P_3$, and $P_4$.

Amplitude $a_{k,n}$ and phase $\Phi_{k,n}$ of subcarrier number n may be calculated as follows by S-calc 245:

$$a_{k,n} = \sqrt{d_{I,k,n}^2 + d_{Q,k,n}^2} \qquad [4]$$

$$\phi_{k,n} = \arctan\left(\frac{d_{Q,k,n}}{d_{I,k,n}}\right)$$

where ak,n and phase Φk,n are the amplitude of subcarrier n and symbol k, respectively. Di,k,n and d Q,k,n are the subcarrier in-phase and quadrature signals respectively for subcarrier n and symbol k.

S-calc 245 may calculate S parameters for the four symbols over the set of subcarriers as follows:

$$S_{1,k} = \sum_{n=1}^{N}(d_{I,k,n}^2 + d_{Q,k,n}^2) - 2\sum_{n=1}^{N/2}(d_{I,k,N+1-n}d_{I,k,n} - d_{Q,k,N+1-n}d_{Q,k,n}) \qquad [5]$$

$$S_{2,k} = \sum_{n=1}^{N/2}(d_{I,k,N+1-n}d_{Q,k,n} + d_{Q,k,N+1-n}d_{I,k,n}) \qquad [6]$$

$$S_{3,k} = \sum_{n=1}^{N}(d_{I,k,n}^2 + d_{Q,k,n}^2) + 2\sum_{n=1}^{N/2}(d_{I,k,N+1-n}d_{I,k,n} - d_{Q,k,N+1-n}d_{Q,k,n}) \qquad [7]$$

where in-phase data $d_{I,1} \ldots d_{I,N}$ and quadrature data $d_{Q,1} \ldots d_{Q,N}$ 253 are available from mapper 241.

One or several sets of four data symbols may be used during the sampling period when imbalance parameters, gain and LO signal leakage are determined.

The S parameters form the basis for F parameters and H parameters as shown below:

$$F_1 = S_{1,2}(S_{2,3}S_{3,4} - S_{2,4}S_{3,3}) + S_{1,3}(S_{2,4}S_{3,2} - S_{2,2}S_{3,4}) + S_{1,4}(S_{2,2}S_{3,3} - S_{2,3}S_{3,2})$$

$$F_2 = S_{1,1}(S_{2,4}S_{3,3} - S_{2,3}S_{3,4}) + S_{1,3}(S_{2,1}S_{3,4} - S_{2,4}S_{3,1}) + S_{1,4}(S_{2,3}S_{3,1} - S_{2,1}S_{3,3})$$

$$F_3 = S_{1,1}(S_{2,2}S_{3,4} - S_{2,4}S_{3,2}) + S_{1,2}(S_{2,4}S_{3,1} - S_{2,1}S_{3,2}) + S_{1,4}(S_{2,1}S_{3,2} - S_{2,2}S_{3,1})$$

$$F_4 = S_{1,1}(S_{2,3}S_{3,3} - S_{2,2}S_{3,3}) + S_{1,2}(S_{2,1}S_{3,3} - S_{2,3}S_{3,1}) + S_{1,3}(S_{2,2}S_{3,1} - S_{2,1}S_{3,2})$$

$$H_1 = S_{2,2}(S_{1,4} - S_{1,3}) + S_{2,3}(S_{1,2} - S_{1,4}) + S_{2,4}(S_{1,3} - S_{1,2})$$

$$H_2 = S_{2,1}(S_{1,3} - S_{1,4}) + S_{2,3}(S_{1,1} - S_{1,4}) + S_{2,4}(S_{1,1}S_{1,3})$$

$$H_3 = S_{2,1}(S_{1,4} - S_{1,2}) + S_{2,2}(S_{1,1} - S_{1,4}) + S_{2,4}(S_{1,2} - S_{1,1})$$

$$H_4 = S_{2,1}(S_{1,2} - S_{1,3}) + S_{2,2}(S_{1,3} - S_{1,1}) + S_{2,3}(S_{1,1} - S_{1,2}) \qquad [8]$$

The energy 209 of the four transmitted symbols may contribute to the calculation of the $P_{LO}$ local oscillator signal power as follows:

$$P_{LO} = -\frac{P_1 F_1 + P_2 F_2 + P_3 F_3 + P_4 F_4}{P_1 H_1 + P_2 H_2 + P_3 H_3 + P_4 H_4}, \qquad [9]$$

The S parameters from S-calc 245 and the P parameters from 209 may be used to compute the epsilon, alpha and g and store the values as imbalance parameters to a cache or storage 250:

$$\varepsilon = \sqrt{\frac{\begin{array}{c}P_1(S_{2,3}(P_{LO}+S_{3,2})-S_{2,2}(P_{LO}+S_{3,3}))+P_2(S_{2,1}(P_{LO}+S_{3,3})-\\S_{2,3}(P_{LO}+S_{3,1}))+P_3(S_{2,2}(P_{LO}+S_{3,1})-S_{2,1}(P_{LO}+S_{3,2}))\end{array}}{\begin{array}{c}P_1(S_{1,3}S_{2,2}-S_{1,2}S_{2,3})+P_2(S_{1,1}S_{2,3}-S_{1,3}S_{2,1})+\\P_3(S_{1,2}S_{2,1}-S_{1,1}S_{2,2})\end{array}}} \qquad [11]$$

$$\alpha = \arcsin\left(\frac{-1}{4\varepsilon} \cdot \frac{\begin{array}{c}P_1(S_{1,2}(P_{LO}+S_{3,3})-S_{1,3}(P_{LO}+S_{3,2}))-P_2\\(-S_{1,1}(P_{LO}+S_{3,3})+S_{1,3}(P_{LO}+S_{3,1}))+\\P_3(S_{1,1}(P_{LO}+S_{3,2})+S_{1,2}(-S_{3,1}-P_{LO}))\end{array}}{\begin{array}{c}P_1(S_{1,2}S_{2,3}-S_{1,3}S_{2,2})+P_2(S_{1,3}S_{2,1}-S_{1,1}S_{2,3})+\\P_3(S_{1,1}S_{2,2}-S_{1,2}S_{2,1})\end{array}}\right)$$

$$g_t = \frac{4P_1}{\varepsilon S_{1,1} + 4\varepsilon\sin(\alpha)S_{2,1} + S_{3,1} + P_{LO}} \qquad [12]$$

The epsilon, alpha and g values may then be stored unchanged in 250. Alternatively, the epsilon, alpha and g values may be updated whenever an additional data symbol in the form of in-phase data and quadrature data 253 is available, or less frequently.

Yet another arrangement for determining the epsilon, alpha and g values includes calculating a first alpha, a first epsilon and a first gain based on the energy of the at least four transmitted symbols; and calculating a second alpha, a second epsilon and a second gain based on the energy of the next symbol. The final steps to reach the alpha, epsilon, and gain values may include calculating an alpha based on an average of the first alpha and the second alpha; calculating an epsilon based on an average of the first epsilon and the second epsilon; and calculating a gain based on an average of the first gain and the second gain. Thus during a compensation period, the imbalance parameters in use may be average values. Many forms of averaging may be used, including weighting a more recent value more heavily, e.g. weighting a second alpha heavier than a first alpha.

The duration when the compensator provides the compensated data signals is known as the compensation period. The compensator 251 may operate in a sampling period acquisition mode where no changes are made to data symbols provided to the compensator, and such symbols are placed onto the IFFT-bus 261 unchanged by the compensator. The compensator may operate in a feedback mode during a compensator period where the compensator 251 provides the compensated in-phase baseband, i.e., first in-phase compensated data symbol (FICDS) 263, and a second in-phase compensated data symbol (SICDS) 265, and compensated quadrature baseband, i.e., a first quadrature compensated data symbol (FQCDS) 262, second quadrature compensated data symbol (SQCDS) 264, signals to the IFFT 271. Modulator 281 may ooerate as an OFDM and may be followed by amplifier 291.

Figure 3:
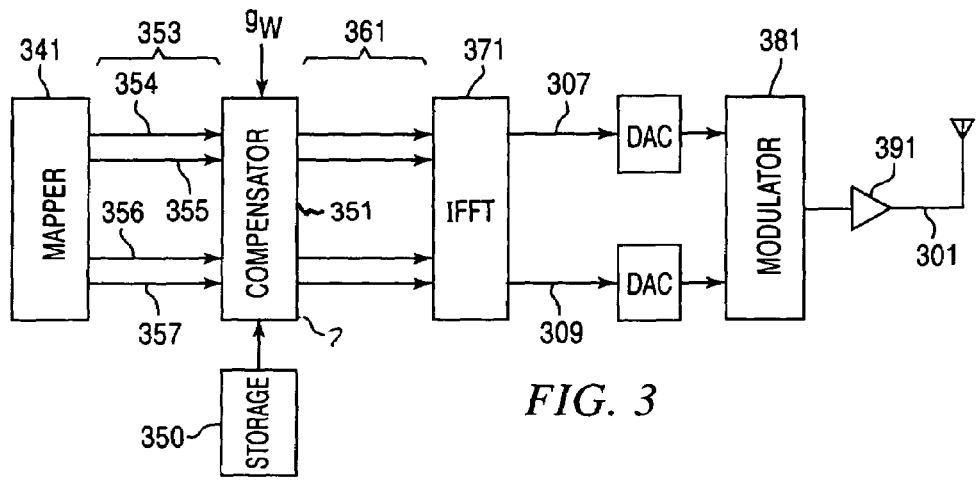
FIG. 3 shows a transmitter according to a factory-calibrated embodiment of the invention.

FIG. 3 shows an embodiment that dispenses with the use of a persistent feedback loop in favor of testing the transmitter output, data symbols at the time of manufacture, and storing the resultant imbalance parameters, epsilon, alpha and gain, in a storage 350 which may be non-volatile. The factory calibration apparatus may sample symbols, denoted by $d_{I,1} \ldots d_{I,N}$ and $d_{Q,1} \ldots d_{Q,N}$ 353 as well as sample amplifier output 301 to derive, by methods similar to those used in FIG. 2, to obtain the epsilon, alpha and gain applicable to symbols transmitted by the amplifier. The data symbols 353 may each comprise a first quadrature subcarrier 354, a first in-phase subcarrier 355, a second quadrature subcarrier 356 and a second in-phase subcarrier 357. Thus, a feedback loop may not be required in the final product that is shipped.

The hardware for the factory-calibrated embodiment may include a compensator 351 reading from the storage 350. Such an apparatus may be inserted to intercept the signals of the prior-art mapper 341, changing the in-phase baseband and quadrature baseband 353 signals to compensated data symbols 361. IFFT 371 produces the I signal 307 and the Q signal 309 by means known in the art. Modulator 381 may operate as an OFDM and may be followed by amplifier 391.

Once the alpha, epsilon and gain values are known, by the feedback loop in FIG. 2, compensation of the current data symbol presented to the compensator 251 may be performed in an operation known as compensating. Each subcarrier component of the current data symbol may be referred to as a next symbol in relation to a data symbol that provided data for computing the alpha, epsilon and gain values of the storage 250. Compensator 251 may perform at least four operations. Compensator 251 may perform at least one first quadrature compensating of a next data symbol, thus obtaining the FQCDS, or $d'_{Q,n}$:

$$d'_{Q,n} = \frac{g_w}{g} \frac{d_{Q,n}(1+\varepsilon\cos(\alpha)) + d_{Q,(n+N/2)}(1-\varepsilon\cos(\alpha)) + \varepsilon\sin(\alpha)(d_{I,n}-d_{I,(n+N/2)})}{2\varepsilon\cos(\alpha)}, \quad [13]$$

for each n valued at 1 through N/2. Compensator 251 may perform at least one second quadrature compensating of a next data symbol, thus obtaining the SQCDS or $d'_{Q,n}$:

$$d'_{Q,n} = \frac{g_w}{g} \frac{d_{Q,(n-N/2)}(1-\varepsilon\cos(\alpha)) + d_{Q,n}(1+\varepsilon\cos(\alpha)) + \varepsilon\sin(\alpha)(d_{I,n}-d_{I,(n-N/2)})}{2\varepsilon\cos(\alpha)}, \quad [14]$$

for each n valued at N/2+1 through N. Compensator 251 may perform at least one first in-phase compensating of a next data symbol, thus obtaining the FICDS, or $d'_{I,n}$:

$$d'_{I,n} = \frac{g_w}{g} \frac{d_{I,n}(1+\varepsilon\cos(\alpha)) + d_{I,(n+N/2)}(\varepsilon\cos(\alpha)-1) - \varepsilon\sin(\alpha)(d_{Q,n}+d_{Q,(n+N/2)})}{2\varepsilon\cos(\alpha)}, \quad [15]$$

for each n valued at 1 through N/2. Compensator 251 may perform at least one second in-phase compensating of a next data symbol, thus obtaining the SICDS, or $d'_{I,n}$:

$$d'_{I,n} = \frac{g_w}{g} \frac{d_{I,n-N/2}(\varepsilon\cos(\alpha)-1) + d_{I,n}(1+\varepsilon\cos(\alpha)) - \varepsilon\sin(\alpha)(d_{Q,n}+d_{Q,(n-N/2)})}{2\varepsilon\cos(\alpha)}, \quad [16]$$

for each n valued at N/2+1 through N.

In each of the foregoing four equations, $g_w$ is the wanted gain, which may be set to a value desired by the operator of the transmitter. If it is desired to use an averaged value of $\alpha$, $\varepsilon$ and g, those values may be used if previously stored in cache 250.

Although the invention has been described in the context of particular embodiments, various alternative embodiments are possible. For example, other transmitters that have baseband I and Q signals of the form shown in equations [1] and [2] may benefit from compensation as shown herein. In addition, calculation of imbalance parameters may occur following the transmission of most symbols, or less frequently, e.g. near the beginning of a packet. Thus, while the invention has been particularly shown and described with respect to specific embodiments thereof, it will be understood by those skilled in the art that changes in form and configuration may be made therein without departing from the scope and spirit of the invention.

What is claimed is:

1. A method for providing a first quadrature compensated data symbol (FQCDS), a second quadrature compensated data symbol (SQCDS), a first in-phase compensated data symbol (FICDS) and a second in-phase compensated data symbol (SICDS) to an inverse fast fourrier transform (IFFT) of a multicarrier quadrature modulator having an amplifier, wherein at least four transmitted symbols are available from the amplifier and at least four data symbols and a next data symbol are available from a mapper, comprising the steps of:
    a) calculating the energy of the at least four transmitted symbols;
    b) calculating an alpha, an epsilon and a gain based on the energy of the at least four transmitted symbols and the at least four data symbols, wherein the alpha, epsilon and gain are imbalance parameters;
    c) storing the alpha, epsilon and gain;
    d) first quadrature compensating the next data symbol of a first quadrature subcarrier based on the alpha, epsilon and gain to produce the FQCDS;
    e) second quadrature compensating the next data symbol of a second quadrature subcarrier based on the alpha, epsilon and gain to produce the SQCDS;
    f) first in-phase compensating the next data symbol of a first in-phase subcarrier based on the alpha, epsilon and gain to produce the FICDS;
    g) second in-phase compensating the next data symbol of a second in-phase subcarrier based on the alpha, epsilon and gain to produce the SICDS;
    h) repeating steps a, b and c wherein the at least four transmitted symbols include a next transmitted data symbol and the at least four data symbols include the next data symbol.

2. The method of claim 1 wherein the step of calculating the alpha, epsilon and gain further comprises the steps of:
    calculating a first alpha, a first epsilon and a first gain based on the energy of the at least four transmitted symbols;
    calculating a second alpha, a second epsilon and a second gain based on the energy of the next data symbol;

calculating the alpha based on an average of the first alpha and the second alpha;

calculating the epsilon based on an average of the first epsilon and the second epsilon; and calculating the gain based on an average of the first gain and the second gain.

3. The method of claim 1 wherein the step of calculating the energy of at least four transmitted symbols further comprises the steps of:
 a) squaring output of a transmitter to provide a squared signal;
 b) sampling the squared signal to provide a squared sample signal; and
 c) integrating the squared sample signal over a symbol duration.

4. An apparatus for providing a first quadrature compensated data symbol (FQCDS), a second quadrature compensated data symbol (SQCDS), a first in-phase compensated data symbol (FICDS) and a second in-phase compensated data symbol (SICDS) to an inverse fast fourrier transform (IFFT) of a multicarrier quadrature modulator having an amplifier, wherein at least four transmitted symbols are available from the amplifier and at least four data symbols and a next data symbol are available from a mapper comprising:
 a) means for calculating the energy of the at least four transmitted symbols;
 b) means for calculating an alpha, an epsilon and a gain based on the energy of the at least four transmitted symbols and the at least four data symbols, wherein the alpha, epsilon and gain are imbalance parameters;
 c) means for storing the alpha, epsilon and gain;
 d) means for first quadrature compensating the next data symbol of a first quadrature subcarrier based on the alpha, epsilon and gain to produce the FQCDS;
 e) means for second quadrature compensating the next data symbol of a second quadrature subcarrier based on the alpha, epsilon and gain to produce the SQCDS;
 f) means for first in-phase compensating the next data symbol of a first in-phase subcarrier based on the alpha, epsilon and gain to produce the FICDS;
 g) means for second in-phase compensating the next data symbol of a second in-phase subcarrier based on the alpha, epsilon and gain to produce the SICDS;
 h) means for repeating implementation of a, b and c wherein the at least four transmitted symbols include a next transmitted data symbol and the at least four data symbols include the next data symbol.

5. The apparatus of claim 4 wherein the means for calculating the alpha, epsilon and gain further comprises:

means for calculating a first alpha, a first epsilon and a first gain based on the energy of the at least four transmitted symbols;

means for calculating a second alpha, a second epsilon and a second gain based on the energy of the next data symbol;

means for calculating the alpha based on an average of the first alpha and the second alpha;

means for calculating the epsilon based on an average of the first epsilon and the second epsilon; and means for calculating the gain based on an average of the first gain and the second gain.

6. The apparatus of claim 4 wherein the means for calculating the energy of at least four transmitted symbols further comprises:
 a) means for squaring output of a transmitter to provide a squared signal;
 b) means for sampling the squared signal to provide a squared sample signal; and
 c) means for integrating the squared sample signal over a symbol duration.

* * * * *